Dec. 23, 1952     A. J. MACEDO     2,622,298
TIE-DOWN MEANS FOR SEATS, CARGO, AND THE LIKE
Filed Dec. 19, 1950
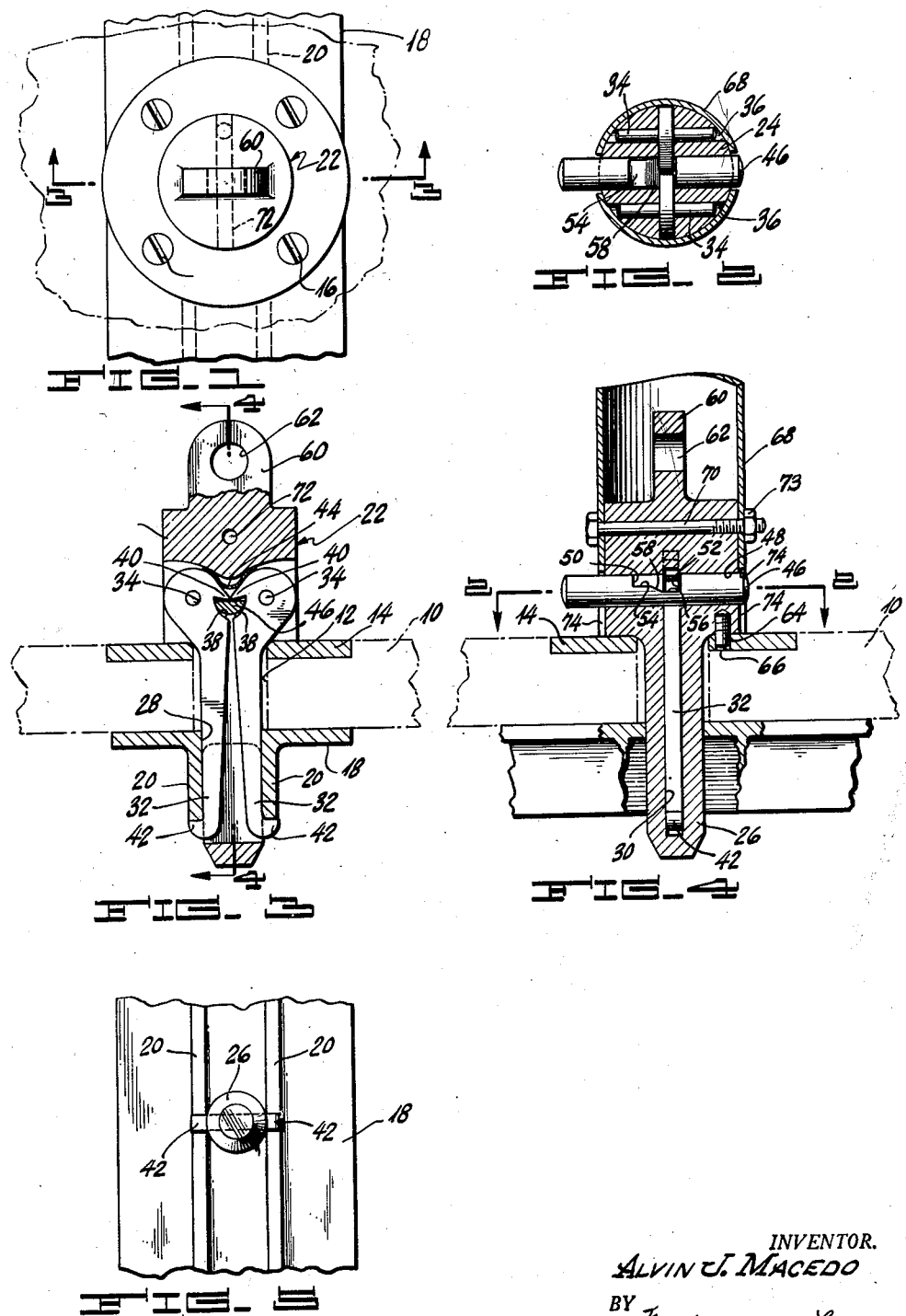
INVENTOR.
ALVIN J. MACEDO
BY
ATTORNEYS Patented Dec. 23, 1952

2,622,298

UNITED STATES PATENT OFFICE 2,622,298

TIE-DOWN MEANS FOR SEATS, CARGO, AND THE LIKE

Alvin J. Macedo, Oakland, Calif., assignor to Transocean Air Lines, a corporation of California Application December 19, 1950, Serial No. 201,645

2 Claims. (Cl. 24—211)

1

This invention relates to attachment means, and more particularly to means especially adapted to serve as seat positioners and fasteners for an aircraft, or, alternately, as cargo tie-downs, when the aircraft seats are rearranged or removed to convert the interior of the craft for cargo carrying purposes. In a broader sense, this invention relates to an attachmet or tie-down system for these purposes and for purposes of an allied nature.

In summary, the fastener system and fastener means of the invention embody one or more sets of spaced rails in underlying relation to the floor of an aircraft or other large passenger or cargo conveying means, aligned apertures in the floor and rails at selected locations constituting desired loci of points for attachment of seats or cargo, and stud-like fastener elements adapted to have their lower ends inserted through the floor and rail apertures and embodying means for selectively engaging said elements in locking relation with said rails and disengaging said elements therefrom, with said elements embodying in their upper ends means for anchoring the legs of seats thereto and means for anchoring cargo tie lines.

The essential objects of the present invention are to provide a simplified and efficiently operable seat and cargo tie-down system in which no fixtures, or difficultly removable elements, protrude above the surface of the floor, thus leaving an unobstructed surface for the movement of cargo, and the like, over the floor, and to provide a flexible tie-down system in the sense that the tie-down loci can be increased or varied to any desired extent by the simple expedient of providing added apertures through the aircraft floor and the underlying rails.

These and other objects and advantages of the invention will be evident from the following description taken in conjunction with the drawing forming part of this specification, and in which:

Figure 1 is a plan view of a fastener element of the invention in place in the floor of an aircraft;

Figure 2 is a view in section taken generally along lines 2—2 of Figure 4, but showing the plunger and arms of the locking system in plan outline;

Figure 3 is a view generally in section taken along lines 3—3 of Figure 1, but showing the arms of the locking system, as well as the upper end of the fastener, in elevational outline;

Figure 4 is a view in section, as taken along lines 4—4 of Figure 3, showing the fastener in tie-down relation to the leg of a seat; and Figure 5 is a bottom plan view of the arrangement of Figure 3.

2

Referring to the drawing for more specific details of the invention, 10 indicates the floor of an aircraft, or the like, having an aperture 12 therethrough, with the floor being preferably provided with a countersunk wear resistant ring 14 in encircling relation to the upper end of the aperture and secured to the floor as by screws 16. In underlying relation to the floor 10 is a rail 18 which may serve as a structural support for the floor, said rail being provided with opposed dependent flanges 20.

A fastener element or tie-down member 22 is comprised of a larger diametral head portion 24 and a smaller diametral stem portion 26 insertable through floor aperture 12 and through aligned aperture 28 provided in rail 18. The tie-down member 22 is provided with a vertically disposed slot 30 extending diametrically therethrough and housing a pair of alike arms 32 pivotally mounted on pins 34 carried in passages 36 extending through head portion 24 in transverse relation to slot 30. At the inner sides of their upper ends the arms 32 are provided with undercuts 38 defining dogs 40, while at their lower ends the arms are provided with outwardly disposed hook-type feet 42 engageable under the edges of rail flanges 20, as shown in Figure 3, to secure the tie-down member in place in the floor 10. A leaf spring 44 centered above and between the dogs 40 and in engagement with head portion 24 serves to normally urge the arms about their pivots to extend the feet 42 from slot 30.

Means for pivoting the arms to selectively withdraw the feet 42 thereof within the slot 30 or to allow said feet to be moved out of the slot under the action of spring 44 are provided in the form of plunger pin 46 movably carried within passage 48 extending transversely through head portion 24. Pin 46 is cutaway at the upper side of its mid-portion, with the cutaway being defined by end walls 50 and 52, and flat surfaces 54 and 56 interconnected by an angularly inclined cam surface 58. The cutaway is of sufficient depth over surface 56 to allow dogs 40 to be moved downwardly by spring 44 to move feet 42 to their extended position, while the cutaway is sufficiently shallow over surface 54 that when said surface is beneath dogs 40 the feet 42 are in their withdrawn position within slot 30. It will be observed that the reduced section portion of pin 46 is received in the undercuts 38 of arms 32 and that the end walls 50 and 52, by engagement with dogs 40, limit the degree of endwise movement of the pin. It will therefore be seen that when the pin 46 is in the position shown in Figure 4 that the tie-down member is locked to the floor, and that endwise movement of the pin to the right, as viewed in Figure 4, causes cam surface 58 to pivot the arms to withdraw the feet thereof out of locking relation with the rail. In this latter condition the tie-down member may be inserted in or removed from the floor.

In order that the tie-down member 22 may be used to fasten cargo in place on floor 10, it is provided at its upper end with an ear 60 provided with an aperture 62 adapted to receive and secure a cargo tie line in place. In order to prevent rotation of the member 22 when it is used as a cargo tie member, which rotation might tend to result due to forces imparted by the tie line, and which rotation might tend to move feet 42 out of locking engagement with rail flanges 20, the member 22 is provided with anti-rotation means in the form of a stud 64 threaded into the base of head portion 24 and receivable in aperture 66 in ring 14, as shown in Figure 4.

It will be understood that the number of cargo tie-downs so provided is dependent only upon the number of rails 18, their spacing, and the number of tie member receiving apertures in the floor and rails. The cargo, of course, is first placed upon the unobstructed floor surface, following which the tie members are selectively placed in the desired pattern.

An alternate use of the tie members is for the securing of passenger seats in place on the floor 10. Figure 4 illustrates the tie member as being secured to the tubular leg 68 of a seat, with the leg being secured in place in sleeved relation to head portion 24 of the tie member by bolt 70 passing through passage 72 in the tie member and aligned apertures in the leg and secured in place by nut 73. The leg is provided with oppositely disposed slots 74 to accommodate the pin 46. A member 22 is provided for each leg of the seat. It will be noted that the anti-rotation means 64 and 66 are not needed when the tie members are used as seat fasteners.

From the foregoing it will be clear that the present invention provides a cargo and seat tie member which is efficiently operable, readily placed and removed.

While a preferred embodiment of the invention has been shown and described, it is to be understood that all substantial equivalents of said embodiment are within the scope of the invention.

What I claim as new and desire to secure by Letters Patent is:

1. A device of the class described comprising a stud-like member having large and small diametral portions, a slot extending longitudinally and medially in said member and common to both diametral portions, a pair of symmetrically disposed alike arms having enlarged and rounded upper ends pivotally connected to said member within said slot and in the large diametral portion of said member, said arms having turned out hook-like foot portions at their lower ends, said lower ends being disposed within said slot and in the small diametral portion of said member, adjacently disposed notches formed at the inner sides of said arms defining thereabove dogs disposed at substantially the level of the points of pivot of the upper ends of said arms, a pin extending through the large diametral portion of said member transversely of said slot and between said arms, said pin being carried for reciprocal sliding movement in said member, said pin having a multi-step notch formed in the upper side of its middle portion, with the steps of said notch being connected by an inclined camming surface, said middle portion of said pin extending through said adjacently disposed notches beneath said dogs with said pin being operable upon endwise movement in one direction to cam said dogs upwardly whereby said arms are pivotally moved to bring their foot portions fully within said slot, and spring means within said slot operable when said pin is moved in the opposite direction to pivotally move said arms to extend said foot portions out of said slot.

2. The device as set forth in claim 1 wherein said spring means consists of an arcuate leaf spring carried within said member in engagement with a surface of said member defining the upper wall of said slot and with said dogs and operable to exert a downward force on said dogs.

ALVIN J. MACEDO.

REFERENCES CITED

The following references are of record in the file of this patent:

UNITED STATES PATENTS

| Number | Name | Date |
|---|---|---|
| 308,763 | Hazen | Dec. 2, 1884 |
| 352,627 | Mix | Nov. 16, 1886 |
| 1,601,359 | Harrington | Sept. 28, 1926 |